May 14, 1968 U. M. WISE 3,382,522
WINDSHIELD WIPER
Filed May 17, 1965 2 Sheets-Sheet 1
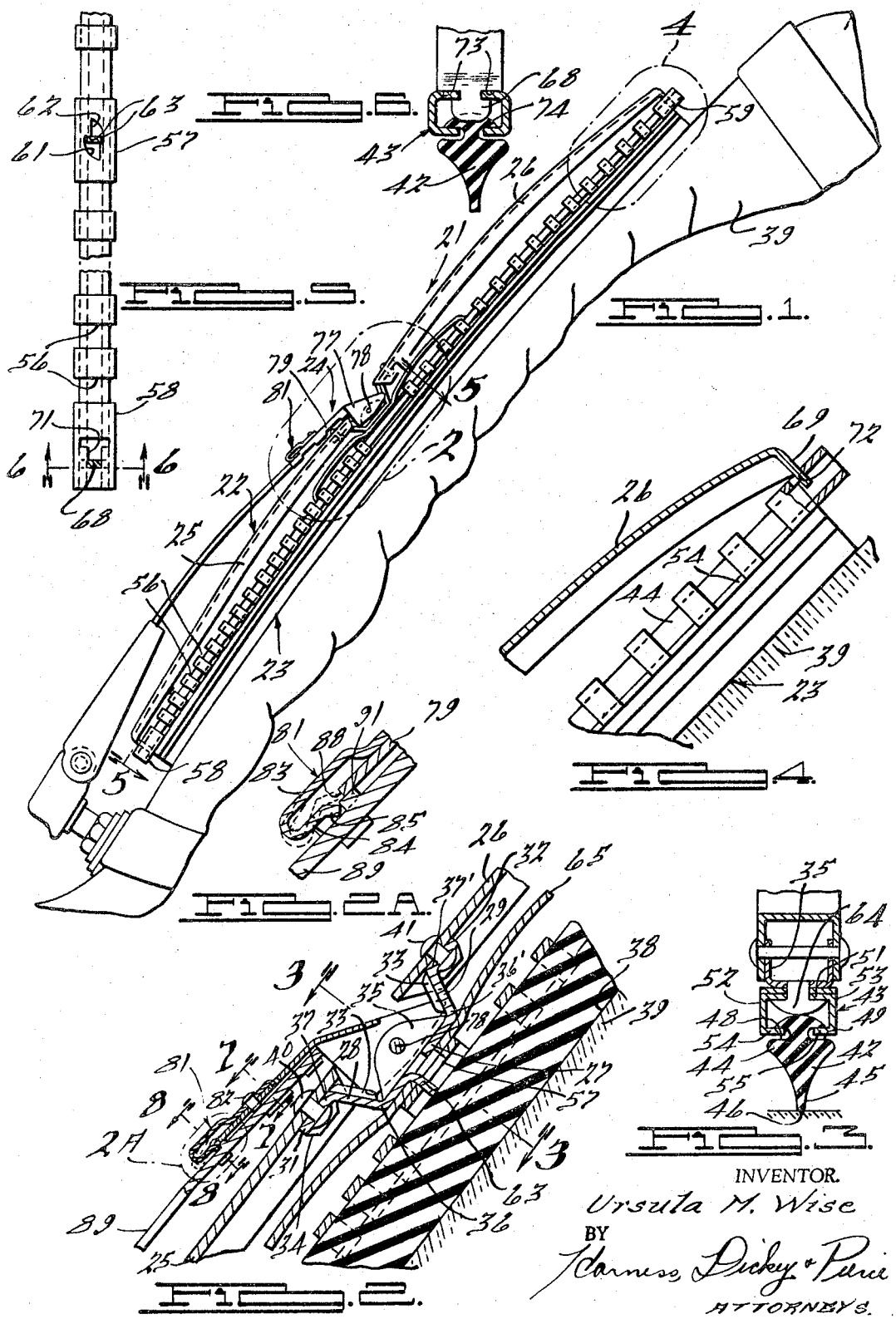
INVENTOR.
Ursula M. Wise
BY Harness, Dickey & Pierce
ATTORNEYS.

May 14, 1968 U. M. WISE 3,382,522
WINDSHIELD WIPER
Filed May 17, 1965 2 Sheets-Sheet 2
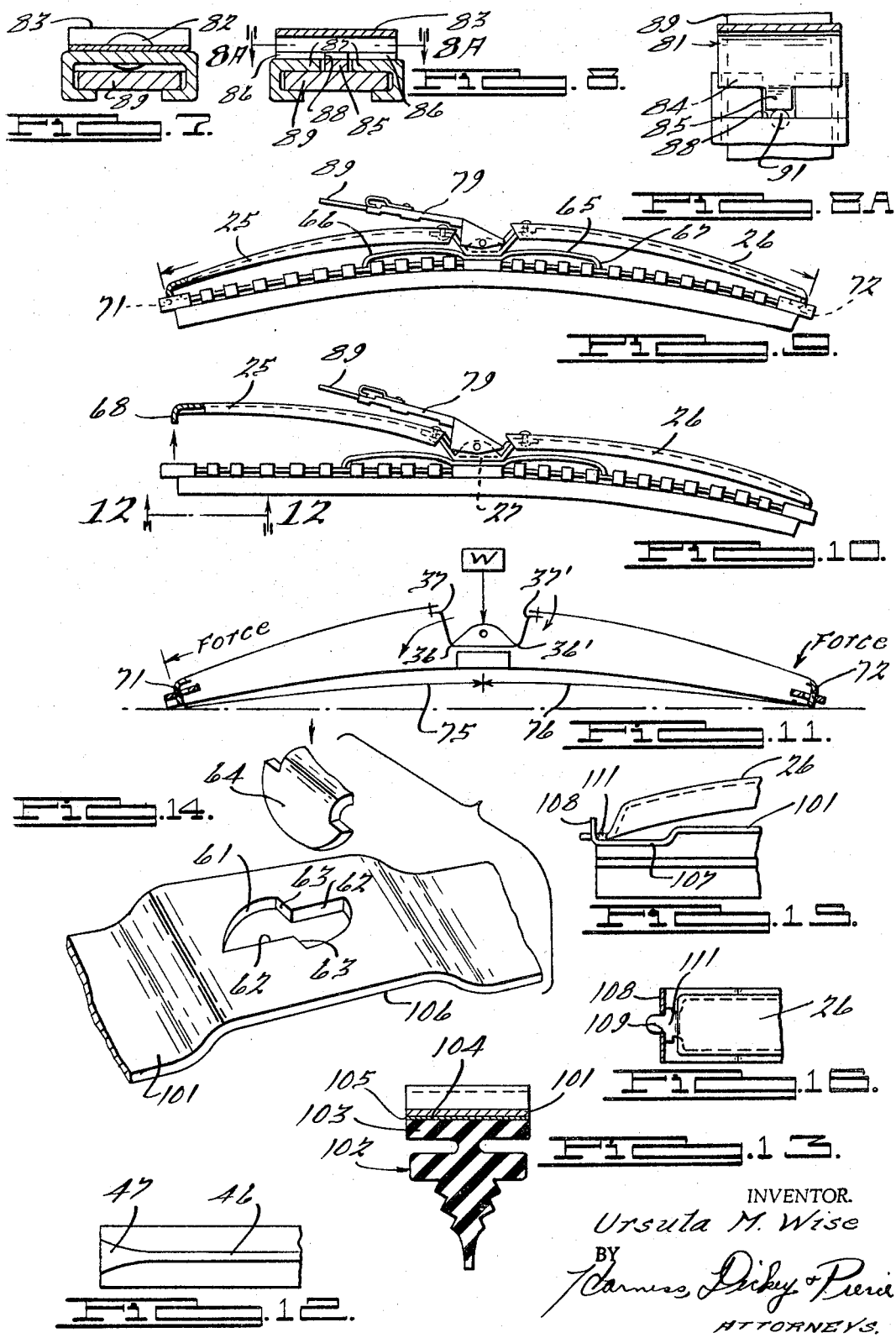
INVENTOR.
Ursula M. Wise
BY
Harness, Dickey & Pierce
ATTORNEYS.

United States Patent Office 3,382,522
Patented May 14, 1968

3,382,522
WINDSHIELD WIPER
Ursula Margot Wise, Columbus, Ind.
(22700 Garrison, Apt. 307, Dearborn, Mich. 48124)
Filed May 17, 1965, Ser. No. 456,243
14 Claims. (Cl. 15—250.42)

ABSTRACT OF THE DISCLOSURE

A windshield wiper having two independent bow actions on two portions of the blade, the bows being connected to flexure means at a medial portion of the carrier, which has transverse slots along its length. The wiper blade lip is flared at its outer ends.

---

This invention relates to windshield wipers, and particularly to wipers adapted for use with curved automotive windshields.

It is an object of the invention to provide a novel and improved windshield wiper which has greatly improved wiping action, particularly on sharply curved windshields, maintaining full contact of the wiping edge with the glass surface throughout the oscillating stroke.

It is another object to provide an improved windshield wiper of this nature which incorporates the advantages of bow-type superstructures, as exemplified by Patent Nos. 3,131,414, issued May 5, 1964, and 3,138,817, issued June 30, 1964, to Ralph H. Wise, but incorporates two completely independent bow actions on two portions of the blade, each action being preadjustable to provide the optimum degree of longitudinal tension and downward force for that portion of the windshield which it traverses.

It is another object to provide an improved windshield wiper having these characteristics, which permits the oscillating arm pressure to be applied to the medial portion of the wiper blade at a point close to the clearance surface, and prevents longitudinal shifting of the wiper blade with respect to this point, thus requiring relatively less torque for wiper oscillation and minimizing the possibility of a "skip-wipe" condition, that is, intermittent slipping and grabbing of the wiper blade on the glass surface.

It is a further object to provide an improved windshield wiper having these characteristics which can be manufactured with relatively few and simple parts and with a minimum of assembly time, thus substantially reducing the cost of manufacture.

It is also an object to provide an improved latch means for removably connecting the wiper arm and the superstructure, the latch means permitting easy separation of the windshield wiper assembly from the oscillating arm using only one hand.

It is another object to provide an improved carrier for windshield wiper blades which permits assembly of the blade to the carrier by longitudinal sliding movement, and in which the outer ends of the superstructure may be utilized to retain the blade on the carrier, thus eliminating the need for adhesives for retention purposes.

It is a further object to provide an improved carrier of this nature which supports the rubber blade in a uniform manner throughout its entire length, thus permitting better control of blade pressure.

It is also an object to provide a novel and improved wiper blade construction which preserves the proper angle of attack of the wiper blade lip on the glass surface throughout its length, and particularly those portions of the lip subjected to greater downward forces.

Other objects, features and advantages of the present invention will become apparent from the subsequent description, taken in conjunction with the accompanying drawings.

In the drawings:

FIGURE 1 is a side elevational view of a windshield wiper assembly embodying the principles of this invention, shown in place on a windshield;

FIGURE 2 is an enlarged fragmentary cross-sectional view taken in the area marked 2 of FIGURE 1 and showing the construction of the medial flexure member as well as the latching means between the oscillating arm and coupler;

FIGURE 2A is an enlarged view of the latch shown in FIGURE 2, taken in the area marked "2A" thereof;

FIGURE 3 is a cross-sectional view taken along the line 3—3 of FIGURE 2 and showing the detachable connection between the flexure member and wiper blade carrier;

FIGURE 4 is an enlarged cross-sectional view taken in the area marked 4 of FIGURE 1 and showing the connection between the outer end of a bow and the carrier;

FIGURE 5 is a fragmentary plan view of a portion of the carrier taken along the line 5—5 of FIGURE 1 and showing the shape of the recess in the medial portion of the carrier which receives the projection on the flexure member;

FIGURE 6 is a cross-sectional view taken along the line 6—6 of FIGURE 5 and showing further details of the connection between the outer end of a bow and the carrier;

FIGURE 7 is a cross-sectional view taken along the line 7—7 of FIGURE 2 and showing further details of the latch construction;

FIGURE 8 is a cross-sectional view taken along the line 8—8 of FIGURE 2, again showing a portion of the latch construction;

FIGURE 8A is a sectional plan view taken along the line 8A—8A of FIGURE 8;

FIGURE 9 is an overall view of the assembly, parts being sectioned, showing the relative positions of the assembly elements;

FIGURE 10 is a view similar to FIGURE 7 but showing the manner in which the outer end of one bow is withdrawn from its carrier recess;

FIGURE 11 is a diagrammatic view similar to FIGURE 7 and showing the directions of the various forces exerted between the flexure member and the bows and between the bows and the carrier;

FIGURE 12 is a view in the direction of the arrows 12 of FIGURE 10, of the outer portion of one end of the wiper blade showing the novel construction thereof;

FIGURE 13 is a cross-sectional view showing a modified form of carrier to which the wiper blade is bonded;

FIGURE 14 is a fragmentary perspective view showing the connecting means between the modified carrier and the flexure member;

FIGURE 15 is a fragmentary cross-sectional view in elevation showing the manner in which the end of a bow is connected to the modified carrier; and FIGURE 16 is a top plan view of the construction of FIGURE 15, partly sectioned to show further details of the connecting means.

Briefly, the illustrated embodiment of the invention comprises a wiper blade supported by an elongated carrier, a pair of bow members above the carrier and removably secured to the ends thereof, and flexure means removably but firmly secured to a medial portion of the carrier and resiliently connected to the inner ends of the bow members. The flexure means is adapted to exert outward and downward forces on the bows, so that that portion of the carrier controlled by each bow will be tensioned, and its outer end will be forced toward the glass surface. In the illustrated embodiment, the flexure member has a central base portion securable to the carrier, and upstanding legs with outwardly directed extensions secured to the bows. The flexure member is suitably fabricated of a resilient material, and the junctures of the base portion and extensions with the legs are of a spring-like nature. The spring strength of each of these junctures may be controlled during manufacture so as to impart the optimum forces to each of the bows. This, plus the relative lengths and shapes of the bows will permit the wiper blade to maintain contact with the glass surface throughout its sweep, even though one portion of the glass surface at any one location may be relatively flat and the other portion sharply curved.

The wiper blade carrier is of novel construction, being fabricated of a strip having a central portion, two parallel leg portions and two inwardly directed flanges which engage grooves in the wiper blade. The web and leg portions of the carrier are provided with a plurality of transverse slots along the length of the carrier, the blade being slidable into assembled position and retained by portions of the bow ends which project into the space within the carrier ends.

A novel latch construction is provided for connecting the coupler, which is pivoted to upstanding ears on the flexure member, to the oscillating arm. This latch means includes a spring-like detent member having a U-shaped portion, one leg of this portion having a projection disposed within a recess in that part of the coupler which receives the arm end. The arm has a projection which is engaged by the detent projection to connect the coupler to the arm. A portion of the detent leg on either side of the projection rests on the edge of the coupler, and depression of the detent will cause its projection to pivot upwardly, releasing the arm so that it may be withdrawn from the coupler.

Another feature of the invention is the wiper blade construction, which includes flared portions at the outer ends of the wiping lip. These flared portions present a wider area of contact with the glass surface, thus minimizing the possibility of collapse of the wiper lip and tending to maintain the outer ends of the lip at their proper angle of attack during the wiping stroke.

Referring more particularly to the drawings, the wiper assembly is indicated generally at 21 and comprises a bow and flexure member subassembly generally indicated at 22, a wiper and blade subassembly generally indicated at 23, and a coupler and latch subassembly generally indicated at 24. Bow and flexure member subassembly comprises first and second relatively rigid bow members 25 and 26 and a flexure member 27 which joins the inner ends of the bow members. Each bow member is of channel-shaped cross section, having a central web portion and a pair of parallel flange portions. The shape of each bow member is such that it will engage an outer end of subassembly 23 while being clear of this subassembly when it flexes during operation. For this reason, bow members 25 and 26 are convex outwardly, and their side flanges are of tapered shape, being narrower at their outer ends than at the inner ends. The relative curvatures of the two members are so chosen that each will provide the optimum forces on the section of subassembly 23 with which it interacts, in a manner described below.

Flexure member 27 comprises a flat base portion and a pair of upstanding legs 28 and 29, as seen in FIGURE 2. Leg 28 has an outwardly directed extension 31, and leg 29 has a similar extension 32.

Legs 28 and 29 are each provided with a pair of stiffening flanges 33, and extensions 31 and 32 are each provided with a pair of stiffening flanges 34. A pair of ears 35 extend upwardly from the side edges of the base of member 27. The base, legs and extensions of member 27 are thus relatively rigid. However, the junctures 36 and 36' between the base of member 27 and legs 28 and 29, respectively, and the junctures 37 and 37' between the legs and extensions 31 and 32, respectively, are resilient and flexible. Member 27 is preferably fabricated of a spring-like material such as beryllium copper. The thickness and dimensions of member 27 are so chosen that each of the four junctures 36, 36', 37, 37' will have a predetermined amount of springiness. As will be seen in FIGURE 2, legs 28 and 29 extend upwardly and outwardly from the base, and extensions 31 and 32 are substantially parallel to the base. Upward flexure of extensions 31 and 32 from their FIGURE 2 position (away from the surface 38 of glass 39), will thus create forces in the junctures, the forces in junctures 36, 36' having a major component parallel to the glass surface, and those in junctures 37, 37' having a major component perpendicular to the glass surface. Extensions 31 and 32 are disposed within the inner ends of bows 25 and 26 respectively, and are rigidly secured thereto by rivets 40 and 41 respectively. The forces described above will thus be created by and react against bows 25 and 26, as will become apparent below.

Wiper blade and carrier subassembly 23 comprises a rubber wiper blade 42 and a wiper blade carrier generally indicated at 43. Wiper blade 42 has a relatively wide attaching portion 44 and a relatively narrow lip 45. The major portion of this lip has a flat outer edge 46 of predetermined width, indicated in FIGURE 3. The outer ends of lip 45, however, are flared, as indicated in FIGURE 12, to present a surface portion 47 of gradually increasing area in an outward direction. This will decrease the unit pressure on lip 45 from what it would normally be at the outer ends, where the forces exerted on the lip are greatest. In a suitable embodiment, the flared portions of lip 45 extend about ¼ inch in from each end.

Attaching portion 44 of blade 42 has a pair of slots 48 and 49 along the opposite sides thereof, for the reception of carrier 43. The carrier comprises an elongated member having a central web portion 51, a pair of parallel side portions 52 and 53, and a pair of inwardly directed flange portions 54 and 55 engageable with slots 48 and 49 respectively. Flanges 54 and 55 are continuous along the entire length of the carrier generally indicated at 43, but side walls 52 and 53 and web 51 are provided with closely spaced slots 56 as indicated in FIGURES 1 and 5, to provide flexibility for the carrier. In the illustrated embodiment, the width of the slots is substantially equal to the distance between the slots. The central portion 57 of carrier 43 is slightly raised, as seen in FIGURE 2, and does not have slots 56. Similarly, the outer end portions 58 and 59 of carrier 43 do not have slots 56.

Portion 57 of slide carrier 43 has a doubly arcuate apertured portion 61, seen in FIGURE 5. This apertured portion has a pair of diametrically opposed arcuate edges extending 90° each, a pair of spaced parallel straight edges 62 extending from the outer ends of the arcuate edges toward each other, and a pair of spaced parallel shoulders 63 joining the last-mentioned edges and the inner ends of the arcuate edges. These edges are seen more clearly with respect to the embodiment of the carried shown in FIGURE 14. A projection 64 with re-entrant shoulders is pressed outwardly from the base of flexure member 27, as seen in FIGURES 2 and 3. Edges 62 and shoulders 63 are each spaced apart a distance equal to the thickness of projection 64. Assembly 22 may therefore be attached to assembly 23 by inserting projection 64 into slot 61 when it is parallel to edges 62 and turning the parts 90° relative to each other, so that projections 64 abuts against edges 63. The shoulder portions of projection 64 will thus be held in position by portion 57 of carrier 43. The fact that portion 57 is raised permits projection 64 to clear the wiper blade. A stiffener member 65 is preferably disposed between the base of flexure member 27 and portion 57 of carrier 43. Member 65 is of elongated shape and spring-like material, its outer ends 66 and 67 being downwardly bent and engaging base portion 51 of carrier 43. Stiffener member 65 will serve to distribute the forces along carrier 43 in such a manner as to insure proper engagement of wiper blade lip 45 with glass surface 37. The means for connecting the outer ends of bows 25 and 26 to the outer ends 58 and 59 of carrier 43 comprise a pair of downward projections 68 and 69 on the outer ends of the bows, as seen in FIGURES 4 and 10, these projections being received by apertured portions 71 and 72 respectively of the carrier. The apertured portions will permit the outer bow ends to engage portions 58 and 59 of the carrier, exerting downward forces thereon. The downward forces on the carrier ends will be exerted through shoulders 73 on each bow above projection 68 or 69, as seen in FIGURE 6. The outward or tensioning forces on the carrier will be exerted by projections 68 and 69 which will be forced against the edges of slots 71 and 72 by the spring forces in flexure member 27, as described above.

The length of projections 68 and 69 is such that they partially overlap the portion 74 of blade 42 which is disposed within the confines of carrier 43, as seen in FIGURE 6. The location of projections 68 and 69 is immediately adjacent the ends of blade 42, and the bow end projections will thus retain the blade in position within the carrier and prevent it from longitudinal sliding movement.

In order to permit the bow ends to be separated from the carrier, when the carrier and blade are being replaced, slots 71 and 72 are T-shaped, as seen in FIGURE 5. Projections 68 and 69 are shouldered, as seen in FIGURE 6, a narrower neck portion of each projection connecting it to the wider portion below. The wider portion may slip into the wider portion of its corresponding slot 71 or 72 and the narrow portion may slip into the narrower portion of the slot, which is outwardly of the wider portion. Since the bows are urged outwardly, they will be held in position, but each may be removed when desired by it pulling back until the wide projection portion is aligned with the wide slot portion. The bow may then be pulled upwardly (see FIGURE 10) to remove it from the carrier. Flexure member 27 will yield to permit this upward movement.

It should be kept in mind that, due to the construction already described, the forces which the two bows 25 and 26 exert on the carrier, in both outward and downward directions, will be independent of each other. That is, referring to FIGURE 11, the tensile and transverse forces in that portion of the carrier marked 75 will be dependent upon the resilient properties of junctures 36 and 37, whereas the forces in the carrier portion marked 76 will be dependent upon the characteristics of junctures 36' and 37'.

Coupler and latch subassembly 24 comprises a coupler 77 pivotally connected to ears 35 of flexure member 27 by means of a pin or rivet 78. Coupler 77 has a central portion and a pair of side portions which overlap ears 35. The sides of the coupler may also overlap the adjacent portion of bow 25, the inner end of bow 26 being so shaped as to be in non-interfering relation with the coupler. It should be noted that the location of pivot 78 is close to the base of flexure member 27, and therefore, a relatively short distance above glass surface 38. The exact height of pivot 78 may be varied to suit individual requirements, but the invention permits a relatively short height, reducing the moment arm and thus contributing to the strength of the wiping action.

Coupler 77 has an arm receiving extension 79 having a central portion, sides and inturned tabs. A latch generally indicated at 81 is secured to extension 79 by a rivet 82. The latch is fabricated of a spring-like material and has an upper or spring section 83 extending outwardly from and parallel to coupler extension 79, a reversely bent fulcrum section 84 beneath section 83, and a detent 85 extending downwardly from section 84 in an inclined maner. Sections 83 and 84 of latch 81 are approximately the same width as coupler 77, but detent 85 is considerably narrower and centrally located with respect to section 84, thus forming a pair of edge portions at the inner end of section 84, as seen in FIGURE 8. These edge portions rest on a pair of shoulders 87 formed at the outer end of coupler extension 79 by a notch 88 formed in the central portion thereof, this notch being of sufficient width to accommodate detent 85 which extends downwardly therethrough.

Latch 81 will have a normal position as shown in solid lines in FIGURE 2A, with detent 85 extending downwardly into the space within coupler extension 79 which receives the oscillating arm 89 of the wiper actuator mechanism. This arm has a projection 91 thereon, and when the arm is inserted in coupler section 79, projection 91 will cam detent 85 upwardly until it snaps into position behind the detent, the latter thereafter preventing the arm from being withdrawn from the coupler because of the resistance of latch 81 to upward bending. When it is desired to remove the wiper assembly from the arm, it is merely necessary to grasp coupler extension 79 with one hand adjacent the latch, and press downwardly with the thumb on latch section 83. This will cause the entire latch 81 to pivot about the edge portions 86 which rest on shoulders 87. The latch will thus assume the dot-dash line position of FIGURE 2A, and it will be noted that in this position detent 85 will have been withdrawn upwardly and into non-obstructing relation with projection 91. This will permit the coupler to be slid off the arm with the same hand which is grasping the coupler extension and latch.

FIGURES 13 to 16 illustrate a modified form of wiper blade carrier which comprises a strip 101 of generally flat shape, the strip being fabricated of a material having spring-like qualities. This strip is used with a wiper blade generally indicated at 102 which has a mounting section 103 with a flat surface 104 of the same width as strip 101. The wiper blade is secured to the carrier by any suitable adhesive 105 which bonds section 103 of the wiper blade to the facing surface of carrier 101.

The medial portion of carrier 101 is raised, as indicated at 106 in FIGURE 14, to accommodate projection 64 of flexure member 27. Section 106 of the carrier is provided with apertured portion 61, as described above, and section 103 of wiper blade 102 will be in noninterfering relation with projection 64 because of the raised nature of section 106. The means for attaching bows 25 and 26 to the ends of carrier 101 are best seen in FIGURES 15 and 16. The ends of the wiper blade are recessed to accommodate the depressed end portions of the carrier, as seen in FIGURE 15. The end portions 107 of carrier 101 are depressed a distance approximately equal to the thickness of section 101, and these ends have upturned projections 108 with central slots 109 as seen in FIGURE 16. The ends of bows 26 and 27 are each provided with a shouldered projection 111 having a narrower portion insertable within slot 109 and a wider portion engageable with flange 108. Projections 111 of bows 26 and 27 are aligned with the undersides of the bows. Because of the locations of slots 109, it will be seen from FIGURE 15 that the outward tensioning forces which the bows exert on the two independently tensionable sections of carrier 101 will be aligned with the main sections of the carrier. These forces will therefore not tend to bend flanges 107, but will have maximum effectiveness in tensioning the carrier.

It will thus be seen that a novel and improved windshield wiper blade assembly has been provided which fulfills the objects stated above. The wiper blade assembly will be fully effective with windshields of varying curvatures, particularly those which have sharply curved outer portions, the forces on the individual carrier sections being preselected in accordance with the shape of the windshield.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a windshield wiper assembly, a flexible elongated wiper blade carrier, first and second bows in tandem relation above said carrier, said bows being relatively rigid, means connecting the outer ends of said bows to the outer ends of said carrier, first resilient means connecting the inner end of one of said bows to a medial portion of said carrier, said first resilient means urging said one bow outwardly and downwardly with respect to said carrier whereby outward and downward forces of predetermined magnitudes will be exerted on one end of the carrier, and second resilient means connecting the inner end of the other bow to said medial portion of the carrier, said second resilient means urging said other bow outwardly and downwardly with respect to said carrier whereby outward and downward forces of predetermined magnitudes will be exerted on the other end of the carrier independently of the forces exerted on said one end of the carrier.

2. The combination according to claim 1, said first and second resilient means each comprising a spring-like element secured at one end to said medial portion of the carrier and at the other end to its respective inner bow end.

3. The combination according to claim 2, said first and second resilient means forming part of a flexure member having a base portion secured to said medial carrier portion, the spring-like elements comprising legs on said flexure member extending upwardly from opposite ends of said base portion, extensions on the upper ends of said legs secured to said inner bow ends, and stiffening flanges on said legs and extensions, the two junctures between each leg and the base portion and corresponding extension being flexible and of such spring-like properties as to create said predetermined forces.

4. The combination according to claim 3, further provided with means for removably connecting said flexure member base portion to said medial carrier portion, said last-mentioned means comprising a slot in said medial carrier portion and a shouldered projection on said flexure member base portion, said slot being so shaped as to receive said projection only when the flexure member and carrier have a first angular orientation and to retain said projection by engagement with the shoulders thereof when the carrier is rotated relative to said flexure member from said first angular orientation.

5. The combination according to claim 3, said flexure member being further provided with a pair of ears extending upwardly from the sides of said base portion, an oscillating arm coupler having a pair of flanges overlapping said ears, and pivotal means connecting said ears and coupler flanges.

6. The combination according to claim 1, said means connecting the outer carrier ends to the bows comprising a T-shaped slot at each carrier end and a downwardly extending shouldered projection on each outer bow end, said last-mentioned projection being receivable by the wider portion of said T-shaped slot and retainable by the narrower portion thereof.

7. The combination according to claim 3, further provided with an elongated stiffening member of spring-like material disposed between said flexure member base portion and said carrier and extending in opposite directions from the medial carrier portion, the outer ends of said stiffening member being engageable with said carrier.

8. In a carrier for a windshield wiper blade, an elongated member having an upper central web portion, a pair of parallel side portions, and a pair of lower inwardly directed flange portions, the flange portions being continuous along the entire length of the carrier, and a plurality of closely spaced transverse slots in longitudinally spaced relation in the web and side walls of said carrier, whereby the carrier will be flexible upwardly and downwardly along substantially its entire extent.

9. In a windshield wiper blade and carrier subassembly, a wiper blade having a relatively wide attaching portion and a relatively narrow lip portion, a pair of slots along opposite sides of said attaching portion, and an elongated carrier having a central web portion, a pair of parallel side portions and a pair of inwardly directed flange portions engageable with said blade slots, the flange portions being continuous along the entire length of the carrier, and a plurality of closely spaced transversely extending longitudinally spaced slots in said carrier side portions and web.

10. The combination according to claim 9, the width of said slots being substantially equal to the distance between said slots.

11. The combination according to claim 9, said blade having a portion within the confines of said carrier, and means for retaining said blade in said carrier, comprising a wiper blade super-structure with projections at the opposite ends thereof, the end portions of said carrier being devoid of said carrier slots but having apertured portions for receiving said last-mentioned projections, the projections being of such length as to partially overlay the ends of that portion of the blade within the confines of said carrier.

12. In a windshield wiper blade construction, a wiping lip on said blade, said lip having a flat outer edge surface of constant predetermined width along the major portion of its extent, flared portions at the opposite ends of said lip, the width of said edge surface being substantially greater than said predetermined width at said flared portions, and a carrier for said blade having portions interfitting therewith but permitting the blade to remain unstressed in a longitudinal direction, whereby all portions of said edge surface including said portions of greater width will be undistorted.

13. A carrier for windshield wiper blades comprising a flexible resilient strip which is flat along the major portion of its extent, a raised medial portion on said strip for accommodating the connecting part of a wiper superstructure, depressed end portions on said strip, said depressed end portions being substantially parallel to the main portions of said strip but offset a distance substantially equal to the thickness of said strip, upwardly extending flanges at the ends of said strip, and slots in said flanges for receiving the ends of a wiper superstructure, said slots being substantially in the plane of the main portions of said strip.

14. In a windshield wiper blade and carrier subassembly, a flexible resilient strip which is flat along the major portion of its extent, a raised medial portion on said strip for accommodating the connecting part of a wiper superstructure, depressed end portions on said strip, said depressed end portions being substantially parallel to the main portions of said strip but offset a distance substantially equal to the thickness of said strip, upwardly extending flanges at the ends of said strip, slots in said flanges for receiving the ends of a wiper superstructure, said slots being substantially in the plane of the main portions of said strip, a wiper blade having a relatively wide attaching portion and a relatively narrow lip portion, a flat surface on said attaching portion having substantially the same width as said strip, and means bonding said flat surface to said strip, the ends of said blade attaching portion being recessed to accommodate the depressed end portions of said carrier.

References Cited

UNITED STATES PATENTS

| | | | |
|---|---|---|---|
| 2,727,271 | 12/1955 | Oishei et al. | 15—250.42 |
| 2,814,822 | 12/1957 | Page | 15—245 |
| 2,942,288 | 6/1960 | Zaiger | 15—250.42 X |
| 3,138,817 | 6/1964 | Wise | 15—250.42 |
| 3,192,551 | 7/1965 | Appel | 15—250.36 |

CHARLES A. WILLMUTH, *Primary Examiner.*